Figure 1:
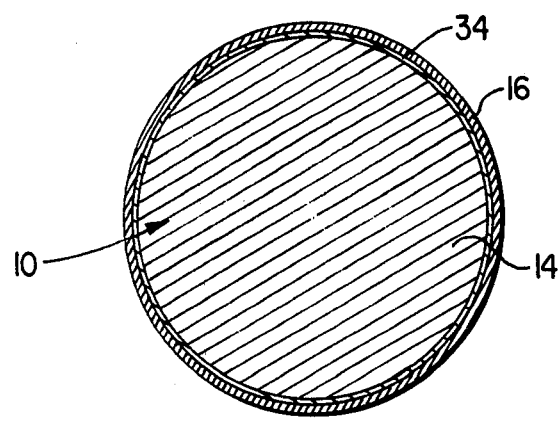

United States Patent [19]

Chuang et al.

[11] 4,374,907
[45] Feb. 22, 1983

[54] GASEOUS HYDROGEN AND OXYGEN COMBINING AND CONDENSING DEVICE

[75] Inventors: Karl T. Chuang, Deep River; Maurice F. Roett, Calgary; Francis W. Lemon, Ottawa, all of Canada

[73] Assignee: Atomic Energy of Canada Limited, Ottawa, Canada

[21] Appl. No.: 298,301

[22] Filed: Sep. 1, 1981

[30] Foreign Application Priority Data

Sep. 29, 1980 [CA] Canada ................................. 363142

[51] Int. Cl.³ ......................................... H01M 10/52
[52] U.S. Cl. ........................................ 429/57; 429/86
[58] Field of Search ................................. 429/86, 57

[56] References Cited

U.S. PATENT DOCUMENTS

| | | | |
|---|---|---|---|
| 2,687,448 | 8/1954 | Gulick et al. | 429/86 |
| 3,497,396 | 2/1970 | Goodwin | 429/120 |
| 3,630,778 | 12/1971 | Kreidl | 429/57 |
| 4,098,964 | 7/1978 | Reber | 429/86 |
| 4,143,123 | 3/1979 | Butler et al. | 423/648 A |

FOREIGN PATENT DOCUMENTS

2301107  2/1975  France ................................. 429/120

*Primary Examiner*—Donald L. Walton
*Attorney, Agent, or Firm*—F. W. Lemon

[57] ABSTRACT

A gaseous hydrogen and oxygen combining and condensing device comprising an inverted cup-shaped casing having a partition dividing the casing into an upper, condensing chamber a lower, catalyst chamber and a heat conducting assembly for conducting heat from the condensing chamber. The catalyst chamber being partially filled with a catalyst assembly comprising at least one catalyst support coated with a porous matrix of polytetrafluoroethylene and exposed, partially platinized high surface area carbon particles dispersed throughout the porous matrix in the weight ratio of the order of 1.5:1 to of the order of 6:1 polytetrafluoroethylene to partially platinized high surface area carbon particles. The catalyst assembly has a reduction in the loss of activity in contact with liquid water, when compared with known catalysts, so that liquid water drains over the catalyst assembly as a coolant without loss of activity of the catalyst and reducing the risk of hot spots occuring in the catalyst which can cause an explosion.

7 Claims, 5 Drawing Figures

GASEOUS HYDROGEN AND OXYGEN COMBINING AND CONDENSING DEVICE

This invention relates to a gaseous hydrogen and oxygen combining and condensing device.

It has already been proposed in U.S. Pat. No. 4,098,964, dated July 4, 1978, "Storage Battery With Recombination Catalyst", H. Reber, to provide a storage battery containing a recombination catalyst wherein the recombined water vapour from the catalyst is conducted by a conduit into the liquid electrolyte of the battery and is condensed therein. The recombination catalyst, which may be aluminum oxide or aluminum silicate coated with a thin layer of platinum and rendered hydrophobic by an outer coating comprising a thin porous layer of polytetrafluoroethylene, is in an upper enclosure through which the evolved gases pass and combine as steam before being directed back into the electrolyte.

While the proposal by Reber is useful, there is still a problem in that the quantity of water lost, by the catalyst failing to recombine the gaseous hydrogen and oxygen is undesirably great. One reason for the undesirably low activity of the catalyst in the Reber process is due to the fact that the catalyst used rapidly loses its activity in contact with liquid water. The outer coating of a thin porous layer of polytetrafluoroethylene cannot prevent water vapour from condensing in the hydrophilic pores when the platinum has been deposited. Because of the high loss of activity of the catalyst when in contact with liquid water, the Reber process must, after the catalyst has become warm, see column 2, line 63 to column 3, line 4, operate at a sufficiently high temperature to utilize the heat generated by recombining the hydrogen and oxygen to ensure that the water vapour thus produced will not condense above, and drop on to, the catalyst as liquid water. This is why with the Reber device it is essential for the recombined hydrogen and oxygen to be condensed in a condensing area by contact with the electrolyte.

There is a need for a gaseous hydrogen and oxygen combining and condensing device wherein:

(i) the catalyst has an acceptable initial activity, (ii) contact of the catalyst with liquid water from the combined hydrogen and oxygen will not cause the catalyst to rapidly lose its activity so that the useful life of the catalyst is extended, (iii) water vapour from the combined hydrogen and oxygen may be condensed above the catalyst, where it collects due to the convection currents caused by the heat evolved in recombining the hydrogen and oxygen, and allowed to drain downwardly as liquid water over the catalyst so that heat evolved in recombining the gaseous hydrogen and oxygen can be conducted away from the catalyst by the liquid water thus retarding thermal degradation of the catalyst.

In the U.S. Pat. No. 4,143,123, dated Mar. 6, 1979, "Process For the Exchange of Hydrogen Isotopes Between Streams of Gaseous Hydrogen And Liquid Water", J. P. Butler et al, there is described a hydrogen isotope exchange process wherein in one embodiment liquid water trickles through a catalyst bed through which hydrogen gas is rising. The catalyst bed comprises catalyst carriers coated with a catalytically active mass comprising a porous matrix of polytetrafluoroethylene with exposed, partially platinized, high surface area carbon particles dispersed in the porous polytetrafluoroethylene matrix in the weight ratio of 1:1 to 3:1 polytetrafluorethylene to partially platinized high surface area carbon particles.

The catalyst bed in the Butler et al patent provides a hydrophobic, hydrogen gas and water vapour receptive catalyst which gives a rapid overall isotopic exchange between the gaseous hydrogen and hydrogen of a vapour phase of the liquid water, and a reduction in the loss of activity by contact with the liquid water.

It has now been found, according to the present invention that selected catalysts of the type disclosed in the Butler et al patent are remarkably good catalysts for use in gaseous hydrogen and oxygen recombining devices because, in contrast to previously known devices, the same device can also use condensed water vapour, that is produced, as a catalyst coolant without the catalyst losing activity by contact with liquid water. This is highlighted by the fact that in some embodiments of the present invention a support for the catalyst is also used to dissipate heat. This in turn provides an additional advantage in that the temperature at which recombination is carried out can be held at a much lower level (below 100° C.) than was previously possible (in the region of 300° C. to 400°), thus retarding thermal degradation of the catalyst, allowing the use of catalysts which exhibit a significant reduction in the loss of activity by contact with liquid water and substantially reducing the risk of hot spots occuring in the catalyst which can cause an explosion by igniting the hydrogen.

According to the present invention there is provided a gaseous hydrogen and oxygen combining and condensing device, comprising:

(a) an inverted, cup-shaped casing, (b) a partition dividing the casing interior into an upper, condensing chamber a lower, gaseous hydrogen and oxygen combining, catalyst chamber, the partition having drainage passages for distribution draining condensed water, from the condensing chamber, across the interior of the catalyst chamber, and (c) a gaseous hydrogen and oxygen combining catalyst assembly partially filling the interior of the catalyst chamber, the catalyst assembly having passages therethrough for the upward flow through the catalyst assembly of gaseous hydrogen and oxygen and the downward flow through the catalyst assembly of condensed water draining from the condensing chamber, the catalyst assembly comprising at least one catalyst support, and a coating on the support, the coating comprising a porous matrix of polytetrafluoroethylene and exposed, partially platinized high surface area carbon particles dispersed throughout the porous matrix, the partially platinized high surface area carbon particles being present in the porous matrix in a weight ratio in the range of the order of 1.5:1 to of the order of 6:1 polytetrafluoroethylene to partially platinized, high surface area carbon particles, and (d) a heat conducting assembly for conducting heat from the upper, condensing chamber, the heat conducting assembly comprising a heat conducting rod sealed to and extending through an upper wall of the casing, heat exchange discs above the casing and secured to the rod above the upper wall of the casing and heat exchange discs in the condensing chamber and secured to the rod, all of the heat exchange discs being secured to the rod for the transmission of heat to and from the rod.

Preferable the platinum content of the recombination catalyst assembly is of the order of 0.2 wt % of the order of the high surface area carbon.

Preferably the partially platinized, high surface area carbon particles are present in the porous matrix in a weight ratio of the order of 3:1.

Figure 2:
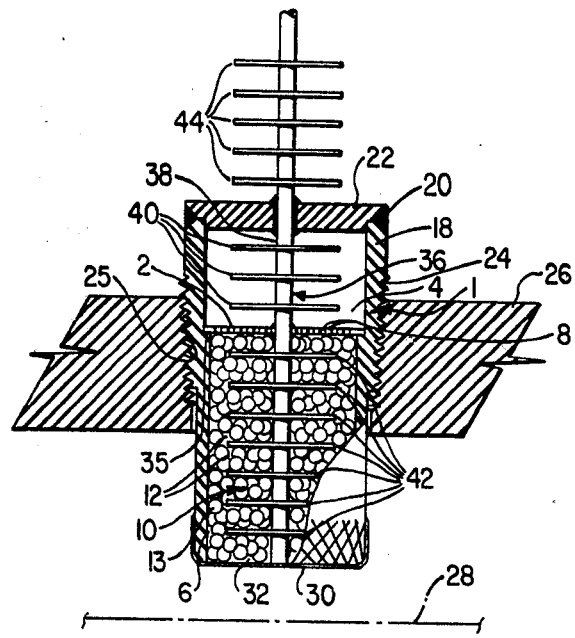
Figure 3:
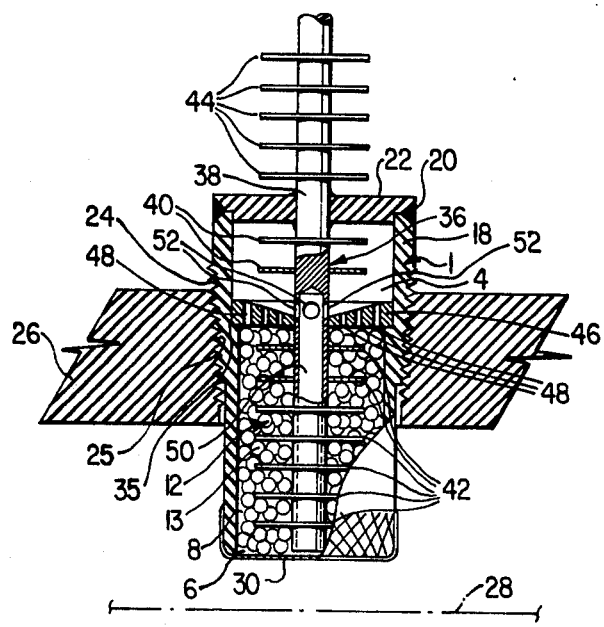
Figure 4:
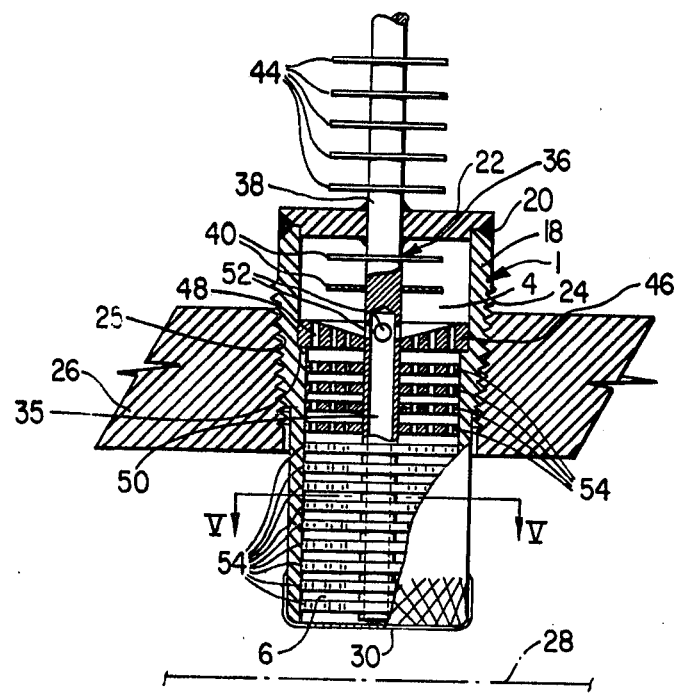
Figure 5:
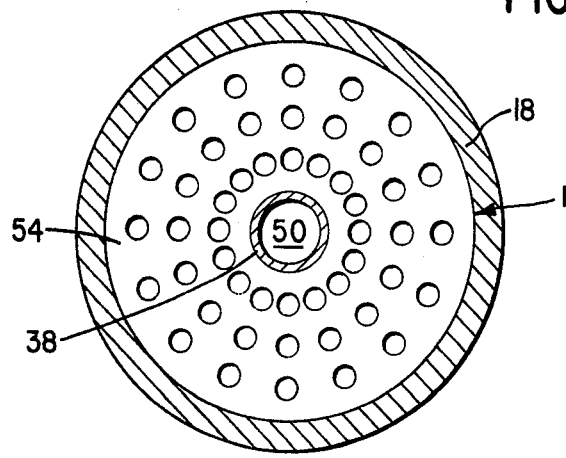

In the accompanying drawings which illustrate, by way of example, embodiments of the present invention, FIG. 1 is an enlarged, sectional side view of a catalyst support and matrix shown in FIG. 2, FIG. 2 is a partially sectioned side view of a gaseous hydrogen and oxygen combining and condensing device for a storage battery, FIG. 3 is a partially sectioned side view of another, different device to that shown in FIG. 2, but which is also a gaseous hydrogen and oxygen combining and condensing device for a storage battery, FIG. 4 is a partially sectioned side view of another, different device to that shown in FIG. 2, but which is also a gaseous hydrogen and oxygen combining and condensing device for a storage battery, and FIG. 5 is a sectional plan view along V—V, FIG. 4.

Referring now to FIGS. 1 and 2 there is shown a gaseous hydrogen and oxygen combining and condensing device comprising:

(a) an inverted, cup-shaped casing 1, (b) a partition 2 dividing the casing interior into an upper, condensing chamber 4 and a lower, gaseous hydrogen and oxygen combining, catalyst chamber 6, the partition 2 having drainage passages, in the form of the openings 8 for distributing draining condensed water, from the condensing chamber 4, across the interior of the catalyst chamber 6, and (c) a gaseous hydrogen and oxygen combining catalyst assembly 10 partially filling the interior of the catalyst chamber 6, the catalyst assembly 10 having passages 12 therethrough for the upward flow through the catalyst assembly 10 of gaseous hydrogen and oxygen and the downward flow through the catalyst assembly 10 of condensed water draining from the condensing chamber 4, the catalyst assembly 10 comprising at least one catalyst support 14 (FIG. 1), and a coating 16 on the support, the coating 16 comprising a porous matrix of polytetrafluoroethylene and exposed, partially platinized high surface area carbon particles dispersed throughout the porous matrix, the partially platinized, high surface area carbon particles being present the porous matrix in a weight ratio in the range extending from of the order of 1.5:1 to the order of 6:1 polytetrafluoroethylene to partially platinized, high surface area carbon particles.

The casing 1 comprises a cylindrical portion 18 sealed by a seal 20 to an end wall 22. The cylindrical portion 18 is screw threaded at 24 for securing the device in a screw threaded plug hole 25 in an upper wall portion 26 of a battery having an electrolyte level 28. A screen 30 is secured to the lower end of the cylindrical portion 18 over an open end 32 thereof to support the catalyst assembly 10 in the catalyst chamber 6.

The catalyst supports 14 (FIG. 1) are spherical and are of alumina and in this embodiment are given an initial, waterproofing coating 34 of polytetrafluoroethylene before being coated with the porous matrix coating 16. The coating 34 increases the life of the catalyst particularly for such applications as the recombination of gaseous hydrogen and oxygen evolved from the electrolyte in electrical batteries. The catalyst supports 14, with their coatings 16 and 34, are randomly packed in the catalyst chamber 6 to form the catalyst assembly 10.

In operation, gaseous hydrogen and oxygen which have been dissociated from water of the electrolyte rise from the electrolyte and pass upwardly through the casing 1 in contact with the catalyst assembly 10 where the gaseous hydrogen and oxygen are recombined as water vapour. Some of the heat evolved in recombining the gaseous hydrogen and oxygen causes the water vapour to rise to the condensing chamber 4 where it is condensed to trickle down over the catalyst assembly 10 as droplets of liquid water to the electrolyte. Heat from the condensation of water vapour in the condensing chamber 4 is dissipated through the heat conducting walls of the casing 1 into the external atmosphere.

Excessive heating of the catalyst assembly 10 by the heat evolved in recombining the gaseous hydrogen and oxygen is avoided by dissipating heat from the catalyst assembly 10 by condensed water from the condensing chamber 4 draining downwardly over the catalyst assembly 10 so that the catalyst chamber 6 is maintained substantially at a temperature of magnitude no greater than 100° C. To this end the partition 2 is essential for distributing draining condensed water, from the condensing chamber 4, across the interior of the chamber 6, in order that the cooling effect of the draining condensed water is available to substantially the whole of the catalyst assembly 10. A perforated screen was found to provide a good partition 2 for this purpose secured on a shoulder 35 in the casing 1.

The initial waterproof coating 34 (FIG. 2) prevents the catalyst supports 14 from absorbing water vapour which would accelerate loss of activity of the catalytically active platinum portion of the porous matrix coating 16.

The largely hydrophobic polytetrafluoroethylene surface of the porous matrix coating 16 provided by the partially platinized, high surface area carbon particles being present in a weight ratio in the range extending from of the order of 1.5:1 to of the order of 6:1 polytetrafluoroethylene to partially platinized, high surface area carbon particles substantially avoids contact between the platinum and the descending water droplets or acid or alkali components of the battery, so that water vapour formed at an elevated temperature at the elements 13 rises allowing fresh gaseous hydrogen and oxygen to be brought into contact with the platinum for recombination. This porous matrix coating 16 also makes it possible for the descending water droplets to not only substantially maintain the temperature of the catalyst chamber at a temperature of magnitude no greater than 100° C. thereby retarding thermal degradation of the catalyst assembly 10 while at the same time washing the catalyst assembly 10 of acid or alkali components of the battery and retarding poisoning of the platinum by these substances. The descending droplets of water also provide a safety feature in preventing hot spots forming on the catalyst assembly 10 which could ignite the gaseous hydrogen and cause an explosion.

A series of tests to verify the present invention were made using 20 cc of catalyst in a device similar to that shown in FIGS. 1 and 2. A steady current was passed through the batteries for a period of a few months and the quantity of water lost from the electrolyte was measured every four days. The tests were conducted using various weight ratios of polytetrafluoroethylene to partially platinized high surface area carbon particles. Best results were obtained with a platinum content of the order of 0.2 wt % of the high surface area carbon, and so this was used in all of the tests listed below wherein the results of the H₂O lost every four days are averaged.

| Polytetrafluoroethylene/Partially Plantinized Carbon Ratio | H₂O Loss from the Battery Electrolyte |
| --- | --- |
| 0 | 40.0 c.c. |
| 1.5 | 17.2 c.c. |
| 3.0 | 13.5 c.c. |
| 6.0 | 19.1 c.c. |
| 10.0 | 26.1 c.c. |

From the test results it will be seen that suitable catalyst assemblies are those wherein the partially platinized, high surface area carbon is present in the porous matrix in a weight ratio in the range extending from of the order of 1.5:1 to of the order of 6:1 polytetrafluoroethylene to partially platinized, high surface area carbon particles and for best results this ratio is of the order of 3:1 where a conversion efficiency of 99.9+wt % of all gaseous hydrogen and oxygen was achieved.

Means, in the form of a heat conducting assembly 36, is provided for conducting heat from the upper condensing chamber 4. The heat conducting assembly 36 comprises a heat conducting rod 38 extending through and sealed in a heat conducting manner to the end wall 22 and the partition 2, heat exchange discs 40 in the condensing chamber 4, heat exchange discs 42 in the catalyst chamber 6 and the heat exchange discs 44 above the end wall 22. The discs 40, 42 and 44 are secured to the rod 38 for the transmission of heat to or from the rod 38.

The catalyst supports 14 with their waterproof coatings 34 and porous matrix coating 16 are randomly packed in the catalyst chamber 6 around the rod 38 between and around the heat exchange discs 42 to form the catalyst assembly 10.

Heat, from the condensing chamber 4 and the catalyst chamber 6 is also dissipated from these chambers by being collected by the discs 40 and 42 respectively, conducted along the rod 38 and passed to atmosphere by the discs 44.

Referring now to FIG. 3, similar parts to those shown in FIGS. 1 and 2 are designated by the same reference numerals and the previous description is relied upon to describe them.

In FIG. 3 the partition comprises a dish 46 having drainage holes 48 for distributing draining condensed water, from the condensing chamber 4, across the interior of the catalyst chamber 6.

The heat conducting rod 38 has a drainage passage 50, extending from its lower end to a bottom portion of the condensing chamber 4, and condensate inlet ports 52 for draining a portion of the condensate from the dish 46 to the drainage passage 50.

In this embodiment a portion of the condensed water vapour in the condensing chamber is drained therefrom down the drainage passage 50. This embodiment has the advantage that the rise of the heated water vapour from the catalyst assembly 12 is not obstructed by the downward flow of too much condensate draining through the catalyst assembly 12.

In FIGS. 4 and 5 similar parts to those shown in FIGS. 1, and 3, are designated by the same reference numerals and the previous description is relied upon to describe them.

In FIGS. 4 and 5, heat conducting, perforated discs 54 are attached in a heat transmitting manner to the rod 38. The discs 54 are each coated with a porous matrix of polytetrafluoroethylene with the exposed, partially platinized high surface area carbon particles dispersed throughout the porous matrix in a weight ratio in the range ranging from of the order of 1.5:1 to of the order of 6:1. Thus the conducting perforated discs 54 are supports for the porous matrices.

In this embodiment the gaseous hydrogen and oxygen flow upwardly through the casing 1 and contact the porous matrix coatings on the perforated discs 54 to be recombined into water vapour before entering the condensing chamber 4. Heat evolved by the recombination is conducted away from the porous matrices by the perforated discs 54 to the rod 38 and is dissipated by the discs 44.

If desired the perforations in adjacent discs 54 may be displaced laterally to provide a tortuous path for the gaseous hydrogen and oxygen.

Further, it may in some instances be desirable to also coat at least one of the discs 40 with a similar matrix to that on the perforated discs 54 so that any gaseous hydrogen and oxygen that may become entrapped in an upper portion of the condensing chamber 4 will also be recombined.

We claim:

1. A gaseous hydrogen and oxygen combining and condensing device, comprising:
    (a) an inverted, cup-shaped casing,
    (b) a partition dividing the casing interior into an upper, condensing chamber and a lower, gaseous hydrogen and oxygen combining, catalyst chamber, the partition having drainage passages for distributing draining condensed water, from the condensing chamber, across the interior of the catalyst chamber,
    (c) a gaseous hydrogen and oxygen combining catalyst assembly partially filling the interior of the catalyst chamber, the catalyst assembly having passages therethrough for the upward flow through the catalyst assembly of gaseous hydrogen and oxygen and the downward flow through the catalyst assembly of condensed water draining from the condensing chamber, the catalyst assembly comprising at least one catalyst support, and a coating on the support, the coating comprising a porous matrix of polytetrafluoroethylene and exposed, partially platinized high surface area carbon particles dispersed throughout the porous matrix, the partially platinized high surface area carbon particles being present in the porous matrix in a weight ratio in the range extending from of the order of 1.5:1 to of the order of 6:1 polytetrafluoroethylene to partially platinized, high surface area carbon particles, and
    (d) a heat conducting assembly for conducting heat from the upper, condensing chamber, the heat conducting assembly comprising a heat conducting rod sealed to and extending through an upper wall of the casing, heat exchange discs above the casing and secured to the rod above the upper wall of the casing and heat exchange discs in the condensing chamber and secured to the rod, all of the heat exchange discs being secured to the rod for the transmission of heat to and from the rod.

2. A device according to claim 1, wherein the partially platinized, high surface area carbon particles are present in the porous matrix in a weight ratio of the order of 3:1.

3. A device according to claim 1, wherein the rod extends through, and is sealed in a heat conducting manner to the partition, to a lower end of the catalyst chamber, and heat exchange discs are secured in a heat transmitting manner to the portion of the rod in the catalyst chamber.

4. A device according to claim 3, wherein the catalyst assembly comprises a plurality of spherical, catalyst supports each coated with the porous matrix and randomly dispersed between and around the heat exchange discs in the catalyst chamber, and a screen is provided secured to a lower, open end of the casing to support the catalyst assembly therein.

5. A device according to claim 3, wherein the catalyst supports are of alumina and have been given an initial, waterproof coating of polytetrafluoroethylene before being coated with the porous matrix.

6. A device according to claim 3, wherein the partition comprises a perforated dish, and the rod has drainage ports and a drainage passage for draining a portion of the condensate from the perforated disc to the lower end of the catalyst chamber.

7. A device according to claim 1, wherein the rod extends through, and is sealed in a heat conducting manner to the portions, to a lower end of the catalyst chamber, heat exchange discs in the catalyst chamber comprise the catalyst support and are attached in a heat conducting manner to the rod, and the heat exchange discs in the catalyst chamber are coated with the porous matrix.

* * * * *